Jan. 17, 1961
E. AULIN
2,968,209
ARRANGEMENT IN OPTICAL MEASURING
APPARATUS FOR WIND TUNNELS
Filed Aug. 24, 1956
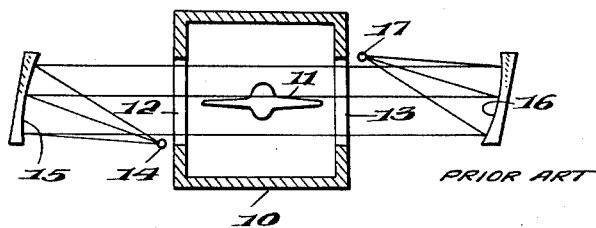
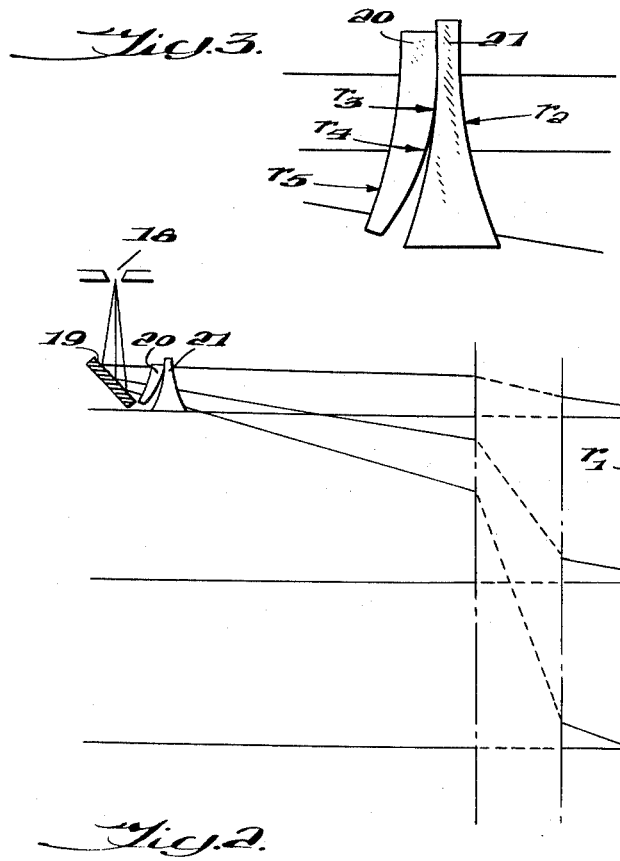
INVENTOR
EVERT AULIN,
BY Larson and Taylor
ATTORNEYS United States Patent Office 2,968,209
Patented Jan. 17, 1961

2,968,209

ARRANGEMENT IN OPTICAL MEASURING APPARATUS FOR WIND TUNNELS

Evert Aulin, Lidingo, Sweden, assignor to Svenska Aktiebolaget Gasaccumulator, Lidingo, Sweden, a corporation of Sweden Filed Aug. 24, 1956, Ser. No. 606,036

Claims priority, application Sweden July 20, 1956

4 Claims. (Cl. 88—14)

The instant invention is concerned with optical systems for studying air flow patterns in wind tunnels, and pertains more in particular to means for correcting coma and color errors in the axes of the respective optical means employed therein.

Wind tunnels are used for observation of the flow of air around objects which fly in the air, for instance airplane bodies. The reading arrangements for observing the flows of air present in the wind tunnel are, as a rule, of optical nature. They function according to the principle given by Foucault and Toepler, the so called slip method. According to this method, the light from a slot-shaped source of light is collimated by a mirror so that it passes in a parallel bundle of rays perpendicularly to the flow of air through the wind tunnel which is provided with windows of high-class optical glass. The light passing through the wind tunnel is collected in a second mirror, in the focus of which a so-called knife edge is applied. Viewing the model in the wind tunnel through this knife edge, one will find that visually it is surrounded by lighter and darker fields, which in reality depend upon varying pressure and temperature relations in the air passing. By photographing and light measuring these fields can be evaluated in the form of pressure gradients and temperature gradients which are informative when investigating the air flows arising around the model, and in many a case will give fully satisfactory information about the air flows.

In order to achieve satisfactory accuracy, the optical system must be of very high quality. Specifically, it should have small aberrations. This demand in combination with the big dimensions required for the small aberrations result in the fact that lens optics were, hitherto, not regarded usable for collimating the light, but that only mirrors could be used. For a wind tunnel system with a very small mirror diameter of only one meter diameter there will be required a 30 meter focal distance in order that the errors shall be sufficiently small.

For protection against wind and weather the optics must be built-in. For protection against vibrations they must rest upon very steady foundations, and the building in which such a wind tunnel together with the optical observation means belonging thereto is enclosed, will have to have very substantial dimensions. As a matter of fact, the building costs make such a system quite expensive.

For decreasing the building dimensions the inventor already has proposed the introduction of a correcting lens system in the path of rays, see Report No. 13 from the Laboratory of Optics, the Royal Institute of Technology, Stockholm published June 2, 1951. According to the proposal made in this report, a negative lens, dimensioned and corrected according to the proposal, is placed between each of the slots and the mirror belonging thereto. Thereby the aberration can be corrected to such a degree, that an equally good system is obtained with only 10 meters focal distance as the above mentioned one with 1 meter mirror diameter.

The present invention refers to a further development of the proposal made in the report.

According to the invention, instead of the known negative correction lens, a correction lens system is introduced, containing a positive and a negative lens. By cooperation between them, one may correct colour errors in the axis as well as coma. One will then gain a further improvement of the reproduction properties of the system, whereby one can further decrease the focal distance of the mirrors together with the lenses without the optical errors in the wind tunnel optical system being so large, that they are of any importance for the measuring accuracy.

The invention will be described below in connection with a form of execution thereof, and in connection with the attached drawings, in which Fig. 1 shows the known arrangement of mirrors with no correction lens, Fig. 2 shows an arrangement according to the invention, and Fig. 3 shows an enlarged detail picture of the correction lens system alone.

In the arrangement according to Fig. 1 it is assumed, that the wind tunnel has a rectangular cross section, which may also be the most usual. The wind tunnel is indicated 10. On the observation place, a model of the body is mounted, the aerodynamic properties of which are to be investigated. In the chosen example it is assumed that this body consists of a model 11 of an airplane. The walls of the wind tunnel on each side of the model 11 are provided with big windows 12, 13 of high-class optical glass for letting through the bundle of rays to be investigated. These rays are emanating from a source of light provided with a slot and possibly also with a mirror optic, schematically indicated by the point 14. For collimating the light emanating from the source of light 14, a collimating mirror 15 is provided in such a way, that the bundle of rays emanating therefrom is parallel and directed perpendicularly to the windows 12, 13 of the wind tunnel.

A second mirror 16 is provided to catch the rays of light passing through the wind tunnel and to collect them in the observation point 17, where the knife edge, known per se, is situated. The knife edge consists of a reproduction of the so-called entrance slot, present in connection with the source of light 14, half covered by a non-transparent screen, which has been introduced in the longitudinal direction of the slot. By viewing the model 11 through the observation slot or the knife edge, one will find the model surrounded by lighter and darker fields, and the division of light may be observed by photographing and these light and dark fields can be evaluated into pressure and/or temperature gradients in the surrounding air flow.

In the known arrangement, there is proposed the introduction of a negative correction lens in the path of rays between the source of light 14 and the mirror 15 as well as between the mirror 16 and the observation device 17.

According to the invention, the earlier known negative lens is now replaced by a lens system consisting of a positive and a negative lens. One form of execution of such a lens system is shown in Fig. 3, and its placing between the source of light and the collimator mirror is shown in Fig. 2.

In the arrangement according to Fig. 2, only one half part of the light passage is shown, viz, the light passage past the mirror 16 to the knife edge 17, which is schematically shown in the figure in the form of a slot 18. For more easily observing the bundle of rays, an inclined plane mirror 19 has been provided to deviate the light onto the slot 18 substantially perpendicularly to the real path of rays. Immediately before the plane mirror 19 the lens system arranged according to the invention is placed. This consists of a positive lens 20 and a negative lens 21.

By providing two lenses in the indicated way, there are two possibilities for compensations as stated per se in the above mentioned report. The one compensation or correction is thereby for colour errors in the axial direction, and the other is for coma correction. In this way it is possible to keep the aberration so small, that it is not of observable order of magnitude even at essentially shorter focal distances than the ones which could earlier be used in wind tunnels optics.

The following example may be mentioned:

The diameter of the mirror 16 is 1 meter and its focal distance 5 meters, which means in other words that the radius $r_1$, see Fig. 2, is 10.000 meters. (The number of decimals indicates the desired precision when grinding the mirror.)

In the active lenses of the lens system 20, 21, the radius $r$ and the distances between the lens surfaces, respectively, measured in the axial level, are as follows (refraction index=1.5163):

| Radius | Axial distance |
|---|---|
| $r_2 = -0.3333$ meter | |
| | 0.01 meter |
| $r_3 = 0.2500$ meter | |
| | 0.00 meter |
| $r_4 = 0.3333$ meter | |
| | 0.02 meter |
| $r_5 = 0.2540$ meter | |

The distance in the axial level from the mirror 16 to the lens surface, limited by the radius $r_2$, is in this case only 4.615 meters. The correction of the lenses by ray control should, of course, take place in the way known per se.

The correction state of the optical system just described as an example will at the said dimensions give an error in the wave level through the wind tunnel, which is not more than 0.02 lightwave lengths of standard Na-light.

The invention is, of course, not limited to the above described lens system, but different modifications may be made within the scope of the invention as defined in the claims. The essential is that one is using as a correction lens system in the above indicated way a lens system, which is composed by a positive and a negative lens. The specific sizing of these lenses may, of course, be other than the one above described as a form of execution of the invention. It is also, of course, possible to replace the positive and/or the negative lens by a system, composed by two or more lenses.

What I claim is:

1. An optical system for studying the air flow pattern in a wind tunnel having first and second opposing windows in two sides thereof, comprising first means mounted outside the first window for producing a beam of light extending through and in a path substantially perpendicular to the planes of the first and second windows and including a light source mounted to one side of the path for the beam and a first spherical mirror mounted to collimate light rays from the source into the beam, second means mounted outside the second window for studying the beam of light and including an observation point disposed to one side of the path for the beam and a second spherical mirror mounted to receive the beam and concentrate the rays thereof on the observation point, means mounted within at least one of the first and second means and for correcting for spherical aberration caused by the spherical mirror within said one means to a predetermined value of error, said correcting means comprising a positive lens and a negative lens, both said lenses being so cooperatively arranged transverse the rays that axial and lateral spherical aberration are, respectively and conjointly, corrected for to said predetermined value of error.

2. An optical system according to claim 1 wherein the positive and negative lens are arranged transverse the rays of light between the light source and the first spherical mirror.

3. An optical system according to claim 1 wherein the positive and negative lens are arranged transverse the rays of light between the second spherical mirror and the observation point.

4. According to claim 1 wherein a positive and a negative lens are arranged transverse the rays of light between the light source and the first spherical mirror and between the second spherical mirror and the observation point.

References Cited in the file of this patent

UNITED STATES PATENTS

| | | |
|---|---|---|
| 2,362,235 | Barnes | Nov. 7, 1944 |
| 2,895,372 | Tacklind et al. | July 21, 1959 |

FOREIGN PATENTS

| | | |
|---|---|---|
| 255,788 | Germany | Jan. 22, 1913 |

OTHER REFERENCES

"Telescoptics," Scientific American, Ingalls, August 1939, pp. 118–123.

"A Sharp-Focusing Schilieren System," Miller et al., pp. 119–129 in Photographic Engineering, vol. 1, No. 4, October 1950, pp. 120–122 cited.